United States Patent [19]
Girardelli

[11] Patent Number: 4,787,783
[45] Date of Patent: Nov. 29, 1988

[54] APPARATUS FOR THE PNEUMATIC CONVEYANCE OF PULVERIZED OR GRANULATED MATTER

[75] Inventor: Maurizio Girardelli, Voghera, Italy

[73] Assignee: Brambati S.p.A., Codevilla-PV, Italy

[21] Appl. No.: 919,169

[22] Filed: Oct. 15, 1986

[30] Foreign Application Priority Data

Oct. 24, 1985 [IT] Italy ................. 22602A/85

[51] Int. Cl.$^4$ ............................. B65G 53/60
[52] U.S. Cl. ......................... 406/106; 414/301; 414/291; 406/120; 406/156; 406/62
[58] Field of Search .......... 406/106, 52, 51, 118, 406/128, 162, 154–156, 157, 163, 181, 183, 120, 1, 2, 71, 62, 67; 222/367; 414/219, 301, 291; 137/876; 73/863.45

[56] References Cited
U.S. PATENT DOCUMENTS

| 310,905 | 1/1885 | Milbank | 406/106 |
| 3,797,890 | 3/1974 | Walters | 406/120 X |
| 4,284,372 | 8/1981 | Smith | 406/156 X |

FOREIGN PATENT DOCUMENTS 472968 4/1951 Canada ................. 406/106

Primary Examiner—Galen Barefoot
Assistant Examiner—James M. Kannofsky
Attorney, Agent, or Firm—Guido Modiano; Albert Josif

[57] ABSTRACT

The apparatus comprises stations or silos for accumulating the material, which are connected to stations for the drawing thereof through a pneumatic line including a recycling section which conveys the "trailings" or residues of material towards the silos thus performing the recovery thereof. Devices mounted on the pneumatic line at the stations perform the drawing of the material during its conveyance in the pneumatic line and discharge it therefrom, while for performing the recycling they allow the free transfer of the residues towards the silos.

5 Claims, 2 Drawing Sheets

APPARATUS FOR THE PNEUMATIC CONVEYANCE OF PULVERIZED OR GRANULATED MATTER

BACKGROUND OF THE INVENTION

The present invention relates to an apparatus for the pneumatic conveyance of pulverized or granulated material between collection units and drawing stations with the extraction of the same material from the flow line during conveyance.

The apparata to which the present invention relates are employed to transfer loose pulverized or granulated material (e.g. flour, corn, granulated plastic material and the like) from collecting silos towards drawing stations wherein the flow of material is interrupted. In these, the material is weighed and discharged onto the machines which employ it. To perform said transfer, a pneumatic line is employed, wherein the air, in aspiration or in compression, conveys the material from the collecting silos towards the drawing stations. These are composed, in conventional apparata, of a decanting cyclone inside which the air is separated from the powders. In particular, the latter fall downwards towards the output of the cyclone which is controlled by a system of valves which are operated by a reducer, while the air originating from the pneumatic line is discharged upwards and conveyed inside filters to separate the residues of power which is still carries. The filtered air is then finally discharged into the environment where the drawing stations are accommodated.

The conventional apparata described above have many disadvantages. Among these, the need to employ a cyclone fitted with valves with a related reducer and a filter, provided in each material drawing point from the pneumatic line; the use of a system of routing valves to route the powders towards the various drawing stations, the number of which cannot obviously increased beyond that of the routings allowed by the valve; the significant bulk represented by the expensive cluster of cyclones and associated filters, the installation of which requires very spacious and high accommodations.

Still another disadvantage lies in the discharge into the environment occupied by the drawing stations of a certain amount of pulverized material dragged along by the air leaving the filters.

The most serious problem, however, is represented by the elimination of the "trailings" or residues of material which remain in the pneumatic line of known apparata. Actually, once the required weighing or metering values of the material are achieved, the valves which control the discharge thereof are closed and significant amounts of material are trapped in the cyclones. This, if discharged, alters the desired values, having a negative effect on the preset mixtures, and the consequences on the costs of recovering the residues are similarly negative. For the recovery and the elimination of the trailings, conventional apparata may comprise a plurality of separate silos for collecting the residues, which makes the apparatus even more complicated, expensive and bulky. The operations related to these recoveries furthermore extend the overall material processing times. The residues, on their part, complicate and hinder the adjustment of the devices of the apparatus, which must be conventionally controlled by electronic controls which easily give rise to problems. These problems are all the more relevant, if it is considered that the circulating material can be of a different nature, and therefore require a specific and selective control of its conveyance.

SUMMARY OF THE INVENTION

The present invention has the aim of overcoming the above said limitations and disadvantages of conventional apparata of the kind described above. In particular, the invention has the object of providing an apparatus for the pneumatic conveyance of loose pulverized or granulated material which is simpler, less bulky and less expensive than those currently in use. It proposes to solve the problems constituted by the drawing of material during the conveyance phase inside the pneumatic line, as well as by the control and the recovery of the "trailings".

This aim and other objects are achieved with the apparatus for the pneumatic conveyance of pulverized or granular material according to the present invention, wherein the conveyance circuit for the material comprises collecting stations and drawing stations for the same material, connected to each other by a pneumatic line for the conveyance of the latter, characterized in that said material conveyance circuit is a closed circuit, said pneumatic line providing a recycling section for the residues of material at said collecting stations.

According to further characteristics of the invention, said drawing stations each comprise a device suitable for drawing and discharging the material from the pneumatic line, during its conveyance inside the latter. This device of the apparatus according to the invention is provided communicating, through the same pneumatic line, with the loading sections of the material to the abovementioned collecting stations; it is also essentially composed of rotating blade means fixed on the pneumatic line with the axis of rotation of the blades parallel to the direction of flow of the material inside the same pneumatic line. Along the latter, and according to a further characteristic of the invention, said drawing stations are arranged in series, each being endowed with the above described device.

The apparatus of the invention is notably advantageous with respect to those currently known. In fact, it no longer entails the use of cyclones and associated valves and filters, but is provided with devices which are simple and easy to produce from elements and materials commonly available on the market; dimensions and overall costs of the apparatus are consequently much lower than those of known systems. The extraction of the material from the pneumatic line is performed in a complete manner without reducing the airflow in the path and the material is discharged without compression. For separating the air from the powder residues, the filters normally provided on the sections for loading material into the collecting silos are advantageously employed, according to the invention, which filters are more efficient than the conventional ones employed on the air vent of the cyclones.

The problems related to the elimination of the residues on the pneumatic line are solved by virtue of the presence of the recycling of the material which is achieved by employing particular drawing and discharge devices which, when the blades are still, allow the free passage of the material along the pneumatic recycling line, while they perform a drawing action when the blades are moving.

The conveyance of the flow of material towards the different drawing stations can be effected, differently from the solutions of the prior art, without the use of routing valves, but simply by controlling the motion of the blades of the same separating devices. In particular, since there is no longer the need to impart preset deviations on the flow of material, it is possible to provide along the pneumatic line any number of drawing stations, the quantity of which is no longer related to the number of ways of any routing device.

BRIEF DESCRIPTION OF THE DRAWINGS

The apparatus of the invention will now be described with reference to the accompanying drawings, which illustrate a preferred embodiment, given only by way of example, of the same invention, wherein.

DESCRIPTION OF THE PREFERRED EMBODIMENTS

Figure 1:
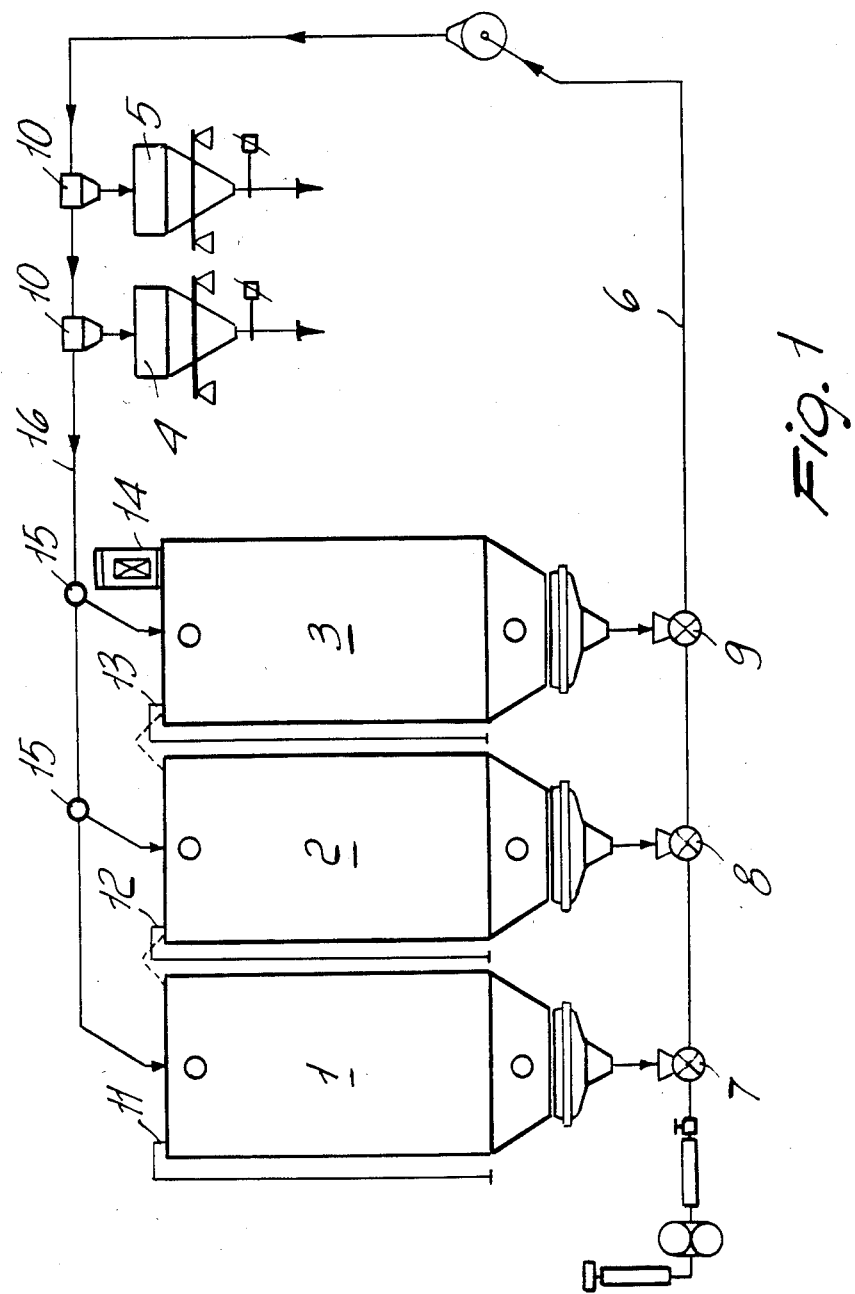
FIG. 1 illustrates the layout of the apparatus according to the invention.

The apparatus illustrated in FIG. 1 comprises a bank of collecting silos 1, 2 and 3, in which the granulated or pulverized material is stored, and a plurality of material drawing stations 4, 5. The apparatus furthermore comprises a pneumatic line provided with the appropriate filters and aspirators (or compressors) generally designated with the reference numeral 6. The material originating from the silos 1, 2 and 3, which in the example described are in the number of three, but which naturally can be in any number whatever, is fed into the pneumatic line 6 through valves, respectively 7, 8 and 9, which control its discharge from the same silos and subsequently is carried along by the air towards the drawing stations 4 and 5. The latter are each provided with a drawing and discharge device 10, intended to remove the material from the pneumatic line during its transfer inside the same and to discharge it towards the stations 4, 5 without decreasing the airflow in the path, and discharging the material free from compression. The air thus freed from powder or granules continues its path towards the sections 11, 12 and 13 for the loading of the material to the silos, respectively 1, 2 and 3. The air outflowing from the silos passes through filter 14, already normally provided in silos, where it deposits the last traces of material and is finally discharged into the atmosphere. In this last section, or recycling section 16 of the pneumatic line 6, two-way valves 15 are provided for directing the flows of the conveyance medium towards the individual silos. The material collected at the stations 4 5 is subsequently weighed and packaged or sent to the specific use. When inside the drawing stations 4 and 5 the desired amount of the circulating material has been achieved, the valves 7, 8 and 9 are closed and the devices 10 are arranged in a recycling position for the residuals of material which fill the pneumatic line in the section between the silos valves and the drawing stations. In this recycling position, the devices 10 allow the free flow of the material towards the collecting silos where, as previously described, it is recovered. Therefore, the pneumatic line 6 is, together with the collecting silos and the drawing stations, a closed circuit for the air and for the material conveyed therein, the residues of which, either deriving from the closing of the valves 7, 8 and 9, or prevented by the air from being subject to the drawing action of the devices 10, are taken back into the silos (and are recovered therefrom) through the recycling section 16 of the pneumatic line 6.

Figure 2:
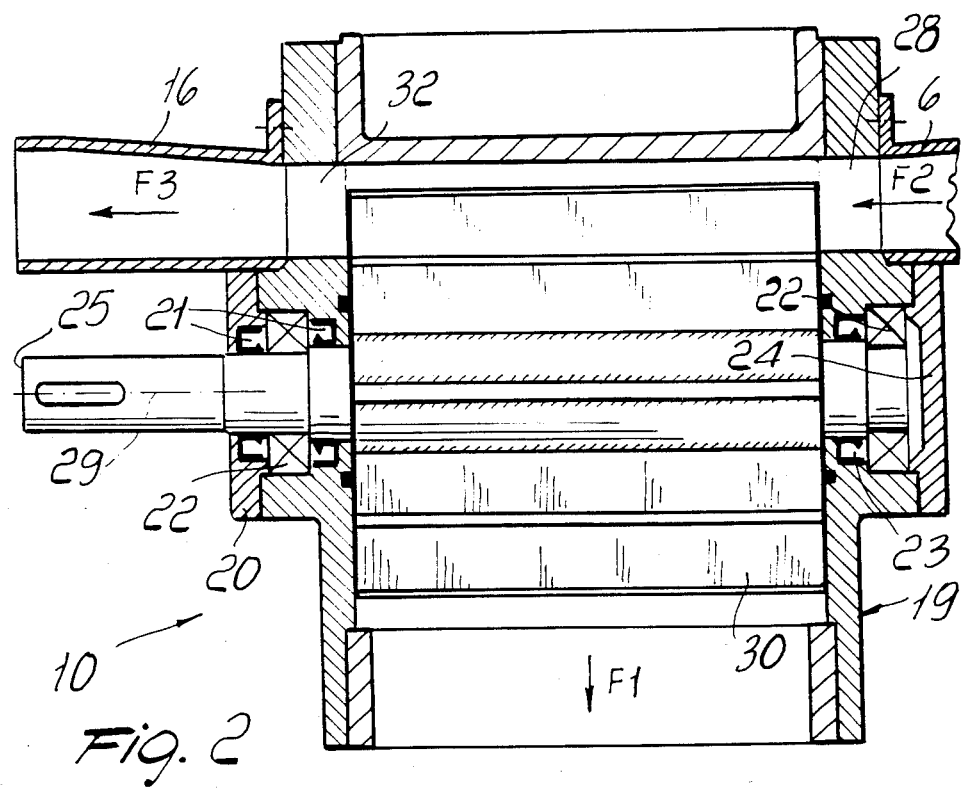
FIG. 2 is an axial longitudinal cross section view of the drawing and discharge device of the apparatus of FIG. 1.
Figure 3:
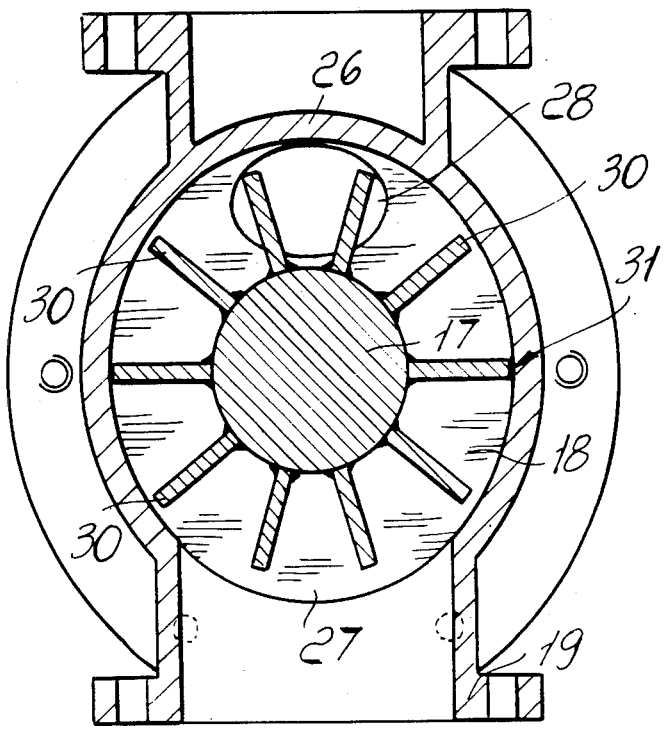
FIG. 3 is a transverse cross section view of the device of FIG. 2.

The device 10 employed in the apparatus of FIG. 1 is illustrated in detail in FIGS. 2 and 3 and is essentially composed of an impeller 17 with blades, rotatably mounted in a chamber 18 provided inside a shell 19 of the same device. The structure of the latter is completed by lateral covers 20, 24 at which the driving axle 25 of the impeller 17 is provided with the associated bearings 22 and sealing rings 21, 23.

The upper part 26 of the shell 19 is closed, while the lower part 27 is open and represents the discharge section for the material towards the stations 4, 5 (arrow F1 of FIG. 2). The air-material mixture enters in the upper part of the chamber 18 through the passage section 28 (FIG. 3) which represents the connecting portion between the pneumatic line 6 and the device 10. The material enters the chamber 18 (arrow F2 of FIG. 2) with a direction which is parallel to that of the axis of rotation 29 of the impeller 17. Here it interferes with the blades 30 which draw material from the flow line and discharge it downwards through the section 27 of the device. Advantageously, the chamber 18 has an oval cross section which is intended to create a certain sealing action at the points of contact 31 between the blades 30 and the internal wall of the same chamber 18. By virtue of this sealing action, the upper part of the chamber 18, traversed by the flow of pressurised air, is isolated from the lower part, so that the material is discharged towards the stations 4, 5 substantially at atmospheric pressure. The air thus freed from the material continues its path flowing out of the opening 32 of the device 10 (arrow F3 of FIG. 2) thus entering the recycling section 16 of the pneumatic line 6. In the recovery phase of the residues of material, or simply if it is desired to interrupt the drawing at one or more stations 4, 5, it is sufficient to stop the motion of the impeller 17, the blades 30 whereof neither exert the drawing of material from, nor constitute an obstacle to the flow of material along the pneumatic line.

By virtue of the particular structure and arrangement of the drawing and discharge devices on the pneumatic line 6, the stations 4, 5 can be mounted in series on the apparatus practically without limitations in number.

Naturally, the invention as described and illustrated is susceptible to variations and modifications without thereby abandoning the scope of the protection if these variations reproduce the embodiment of a closed cycle of the material between the collecting and drawing stations by means of devices which extract the material from the flow line during its conveyance.

I claim:

1. An apparatus for pneumatic conveyance of pulverized and granulated material with a closed material conveyance circuit,
    said conveyance circuit comprising material collecting stations, material drawing stations and a pneumatic line connecting said collecting stations to said drawing stations,
    said pneumatic line including a transport section for transporting the material from said collecting stations to said drawing stations along a material flow direction and a recycling section for transporting material residues from said drawing station to said collecting stations, said drawing stations comprising each means for drawing the material from the pneumatic line during conveyance thereof inside said line and discharging said material inside the drawing stations, said means for drawing the material comprising rotating blade means mounted on said pneumatic line and having a rotation axis, said rotation axis being substantially parallel to said material flow direction inside said pneumatic line.

2. An apparatus according to claim 1, wherein said means for drawing the material comprises a containment chamber accommodating said rotating blade means and having an upper and a lower part, said upper part communicating with said pneumatic line and said lower part communicating with said drawing stations.

3. An apparatus according to claim 2, wherein said containment chamber has an oval cross-section with an inner wall including an intermediate narrow portion comprised between said upper and lower parts of the containment chamber, said intermediate narrow portion having a diameter substantially equal to and interfering with said rotating blade means to define sealing surfaces isolating said upper part of said containment chamber and said pneumatic line from said lower part of said containment chamber and said drawing stations.

4. An apparatus according to claim 1, wherein said drawing station and said means for drawing the material are arranged in series on said pneumatic line.

5. An apparatus according to claim 1, wherein said collecting stations have a material loading section communicating with said recycling section for discharging said material residues into said collecting stations.

* * * * *